United States Patent
Chiang et al.

(10) Patent No.: US 7,498,699 B2
(45) Date of Patent: Mar. 3, 2009

(54) ELECTRET AND COMPOSITE FORMED THEREWITH

(75) Inventors: Dar-Ming Chiang, Jhudong Township, Hsinchu County (TW); Wen-Liang Liu, Jhudong Township, Hsinchu County (TW); Jen-Luan Chen, Jhudong Township, Hsinchu County (TW); Lon-Cheng Cheng, Jhudong Township, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 53 days.

(21) Appl. No.: 10/791,504

(22) Filed: Mar. 1, 2004

(65) Prior Publication Data

US 2005/0107555 A1    May 19, 2005

(30) Foreign Application Priority Data

Nov. 14, 2003    (TW) .............................. 92131939 A

(51) Int. Cl.
*B32B 27/00*    (2006.01)

(52) U.S. Cl. ................. 307/400; 428/304.4; 428/319.3; 428/319.7; 428/305.5; 367/170

(58) Field of Classification Search ................ 525/125; 428/315.9, 318.4, 319.3, 319.7; 307/400
See application file for complete search history.

(56) References Cited

U.S. PATENT DOCUMENTS

| | | | | |
|---|---|---|---|---|
| 3,607,754 | A * | 9/1971 | Asahina et al. | 307/400 |
| 4,513,049 | A * | 4/1985 | Yamasaki et al. | 428/194 |
| 4,560,737 | A * | 12/1985 | Yamamoto et al. | 525/72 |
| 4,931,505 | A * | 6/1990 | Miyazaki et al. | 525/125 |
| 5,610,455 | A * | 3/1997 | Allen et al. | 307/400 |
| 2002/0168564 | A1 * | 11/2002 | Wensley | 429/144 |
| 2003/0054716 | A1 * | 3/2003 | Chou et al. | 442/110 |

\* cited by examiner

*Primary Examiner*—Hai Vo
*Assistant Examiner*—Anish Desai
(74) *Attorney, Agent, or Firm*—Thomas, Kayden, Horstemeyer & Risley

(57) ABSTRACT

An electret and composite formed therewith. The electret includes a polymer, copolymerizing from monomers including VdF as a first monomer and HFP, CTFE, TFE, or combinations thereof as a second monomer.

14 Claims, 4 Drawing Sheets

ELECTRET AND COMPOSITE FORMED THEREWITH

BACKGROUND OF THE INVENTION

1. Field of the Invention

The present invention relates to an electret, and more specifically to an electret polymer comprising compounds other than perfluorinated polymer, the electret polymer is prepared from copolymerizing Vdf and other monomers.

2. Description of the Related Art

Electrets are often applied in microphones, filters, dc and ac motors, radiation detectors, dosimeters, memory storage units, vibration detectors, humidity meters, pressure gauges, electrostatics relays, current generators, voltage generators, electron beam deflectors, and other products. The electret can be manufactured by heating and applying an electric field, a corona discharge, or electron bombardment. A monocharge electret can be manufactured by electron bombardment. The electret is polarized when manufactured by the other two methods. The electret must possess long-term stability and be resistant to humidity and contaminants. Perfluorinated polymers such as PTFE, Teflon AF, and FEP can meet these requirements, but are too expensive and insoluble, resulting in diminished processability, thereby limiting their application. Some organic polymers such as polypropylene, polyethylene, and polycarbonate are cheap, chemically stable, and provide excellent mechanical properties and processability, but with a high charge decay rate when used as an electret, resulting in short lifetime and impracticality for long-term application.

William D. Budinger discloses a binder mixture having PTFT as electret particles, PU, and DMF in U.S. Pat. No. 5,384,337. A matrix of fibers is impregnated with the mixture and cured, whereby the electrets are substantially uniformly distributed throughout the matrix to produce an electrostatic porous material. However, William D. Budinger does not disclose any data regarding surface potential decay, resulting in the performance of the electrostatic porous material remaining unknown.

W. Wirges et al. disclose thermosetting electrets with higher Tg such as benzocyclobutene (BCB) and perfluorocyclobutene in the 10th International Symposium on Electrets. The initial surface potential of a film of either of the electrets is approximately 300V when performing corona discharge under 7 KV. However, the electrets are expensive, with low initial surface potential, and with high potential decay rate even at room temperature.

Isao Sumita discloses poly-3,3-bis(chloromethyl)-oxacyclobutane of 200 μm thick in U.S. Pat. No. 4,046,704, with initial surface potential approximately 600V when disposed in an electric field of 2000V at 160° C. and then cooled to room temperature. The potential decay of the film 30 days from polarization is not apparent but convincing data are again not provided. The initial surface potential of the film is also unclear.

Marvin E. Jones et al. disclose a fluorinated electret in U.S. Pat. No. 6,432,115, such as polyethylene, polypropylene, or polystyrene performing surface fluorination by corona discharge under fluorine containing gas such as $C_5F_{12}$, $C_2F_6$, $CF_4$, or $NF_3$ to suppress the absorption of oily aerogels from the environment, resulting in improving filtering effect and lifetime of a filter using the electret. The initial surface potential and potential decay rate of the electret are not disclosed and remained unknown.

SUMMARY OF THE INVENTION

Thus, objects of the present invention are to provide an electret and composite formed therewith, in order to provide better charge stability, better adhesion with a substrate, improvement of composition match with the substrate, better processability, and better solubility in a solvent resulting from a composition of vinylidene fluoride (VdF) copolymer and compounds other than perfluorinated polymer.

In order to achieve the described objects, the present invention provides an electret having a polymer copolymerizing from VdF as a first monomer and HFP, CTFE, TFE, or combinations thereof as a second monomer.

The present invention further provides an electret composite having a substrate and an electret coating on the substrate. The electret has a first polymer copolymerizing from VdF as a first monomer, and HFP, CTFE, TFE, or combinations thereof as a second monomer.

The present invention further provides an electret composite having a porous substrate and an electret coating on the substrate along the profile thereof. The electret has a first polymer copolymerizing from VdF as a first monomer, and HFP, CTFE, TFE, or combinations thereof as a second monomer.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
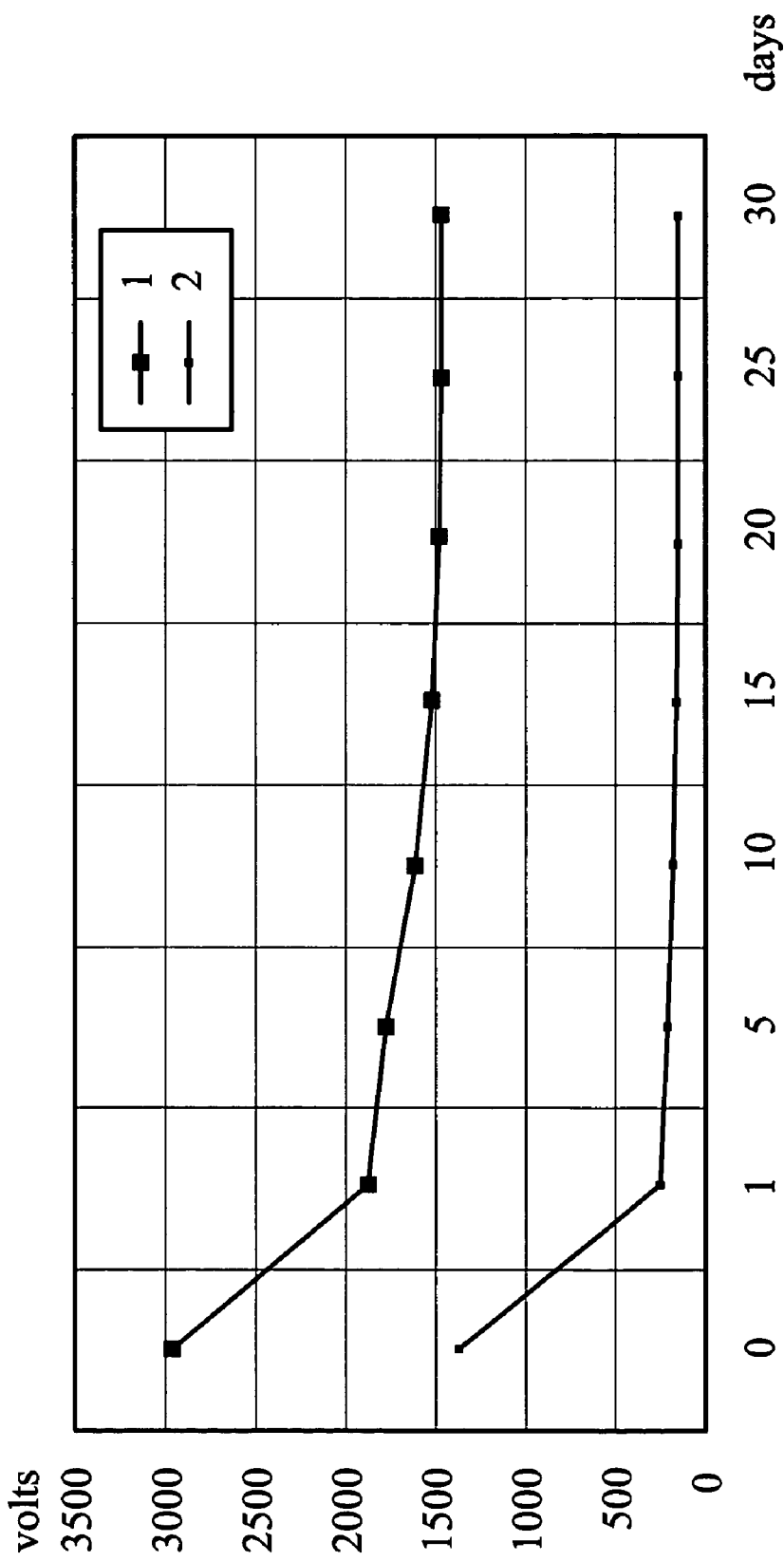
FIG. 1 is a trend chart of results of initial surface potential and charge stability of the polarized electret of the present invention.

The following embodiments are intended to illustrate the invention more fully without limiting the scope of the claims, since numerous modifications and variations will be apparent to those skilled in this art.

The electret of the present invention, comprising a polymer comprising compounds other than perfluorinated polymer, these polymer are prepared from copolymerizing VdF and other monomers such as HFP, CTFE, TFE, or combinations thereof, provides better charge stability and processability at lower cost. The content of VdF in the polymer is preferably between 10 and 80 mole %. The content of HFP in the polymer is preferably approximately 30 mole % or less. The content of CTFE in the polymer is preferably approximately 30 mole % or less. The content of TFE in the polymer is preferably approximately 40 mole % or less. The content of fluorine in the polymer is preferably between 60 and 76 wt % in order to not negatively affect the polarized initial surface potential and charge stability, solubility, and application, such as adhesion with a substrate, of the electret of the present invention.

At most 30 mole % of organic monomers, such as cyclohexyl vinyl ether, 4-hydroxybutyl vinyl ether, ethyl vinyl ether, methyl methacrylate, butyl acrylate, 4-hydroxyl ethyl methacrylamide, glyceryl methacrylamide, acrolein, butyl vinyl ether, propionic vinyl ether, α,α-dimethylpropionic vinyl ether, or combinations thereof, can be added to the polymer comprising compounds other than perfluorinated polymer of the present invention and copolymerized with VdF and other monomers such as HFP, OTFE, TFE, or combinations thereof in order to further enhance the solubility and adhesion with the substrate of the electret without negative affect on the polarized initial surface potential and charge stability thereof.

Other organic polymers, such as polymethacrtlate, polyvinyl acetate, polycarbonate, polyurethane, polyester, polyimide, poly(butylene terephthalate), or polystyrene, can mix with the polymer comprising compounds other than perfluorinated polymer of the present invention to form the electret of the present invention. The content of the organic polymers in the electret is preferably approximately 60 wt % or less. Further, a substrate, such as polyethylene, polypropylene, poly(butylene terephthalate), polytetrafluoroethylene, poly(tetrafluoro ethylene/ethylene), or polystyrene, can be coated with the electret of the present invention by a solvent process dissolving the electret in a solvent or directly heating the electret to form the electret composite of the present invention. The substrate can be film, plate, fiber, nonwoven fiber, or woven fiber. When the electret of the present invention is dissolved in the solvent, the substrate can be coated by impregnation, spraying, or spin-coating. Furthermore, the electret of the present invention can be porosified by solvent, supercritical fluid, or thermal decomposition in order to lower the dielectric constant thereof and increase the surface area thereof to carry more charges. The solvent process is described in subsequent examples. When the electret of the present invention is porosified by a supercritical fluid, a carbon dioxide supercritical fluid enters and dissolves in the electret, followed by heating of the electret at a heating rate according to the predetermined void diameter of the porous electret. When the temperature is over the Tg of the electret, the carbon dioxide dissolved therein will expand the molecular chain thereof, and thus porosify the electret. When the electret of the present invention is porosified by thermal decomposition, the electret is mixed with a thermally decomposable material, followed by heating of the mixture to porosify the electret.

The electret of the present invention is soluble in solvents such as ethyl acetate, acetone, methyl ethyl ketone, methyl isobutyl ketone, 1-methyl-2-pyrrolidone, dimethyl sulfoxide, dimethylformamide, or combinations thereof. Moreover, the initial surface potential of the electret of the present invention can be between 1350 and 2950V when polarized by corona discharge under a potential difference of approximately 18 KV. The surface potential of the polarized electret can only decay to about 12% to 55% of the initial value when standing for approximately 10 days from polarization at room temperature. When the electret of the present invention is previously porosified, the initial surface potential thereof can be between 2820 and 2950V when polarized by corona discharge under a potential difference of approximately 18 KV, and the surface potential thereof can only decay to about 50% to 55% of the initial value when standing for approximately 10 days from polarization at room temperature.

EXAMPLE 1

A copolymer comprising monomers of VdF/HFP/TFE was fabricated. First, 950 ml. of D.I. water, 1 g of ammonium salt of perfluoro(octanoic acid), and 0.1 g of polyoxyethylene lauryl ether as a surfactant were added to a autoclave of 2 L. Then, the oxygen in the autoclave was purged by a nitrogen flow for approximately 30 minutes. Next, a monomer mixture of VdF/HFP/TFE with molar ratio approximately 72:8:20 was added to the autoclave at 60° C. and then pressurized to approximately 8 kg/cm$^2$. Next, 0.4 g of ammonium persulfate was added to induce polymerization at 60° C. and 350 RPM. Further, the monomer mixture was continuously added to maintain pressure at approximately 8 kg/cm$^2$ when the autoclave started to decompress after approximately 2 hours from polymerization. Finally, the autoclave was decompressed and cooled to room temperature after approximately 22 hours from polymerization and the retained monomers were recycled. The solid content of the suspension of the copolymers was approximately 35 wt %. The intrinsic viscosity of the copolymers dissolved in methyl ethyl ketone was approximately 1.09 at 35° C.

EXAMPLE 2

A copolymer comprising monomers of VdF/TFE was fabricated. First, 950 ml. of D.I. water, 1 g of ammonium salt of perfluoro(octanoic acid), and 0.1 g of polyoxyethylene lauryl ether as a surfactant were added to a autoclave of 2 L. Then, the oxygen in the autoclave was purged by nitrogen flow for approximately 30 minutes. Next, a monomer mixture of VdF/TFE with molar ratio approximately 80:20 was added to the autoclave at 60° C. and then pressurized to approximately 8 kg/cm$^2$. Next, 0.1 g of ammonium persulfate was added to induce polymerization at 60° C. and 350 RPM. Further, the monomer mixture was continuously added to maintain pressure at approximately 8 kg/cm$^2$ when the autoclave started to decompress after approximately 1 hour from polymerization. Finally, the autoclave was vented and cooled to room temperature after approximately 18 hours from polymerization and the retained monomers were recycled. The solid content of the suspension of the copolymers was approximately 33.5 wt %. The intrinsic viscosity of the copolymers dissolving in methyl ethyl ketone was approximately 1.45 at 35° C. The TGA data (exposing the copolymer in air with heating rate approximately 10° C./min.) showed the copolymer started to slowly decompose at approximately 300° C., and at 460° C., half thereof was decomposed.

EXAMPLE 3

The electret of the present invention was porosified by a solvent process. First, 5 g of the copolymer of example 2 and 1.48 g of poly(methyl methacrylate) with Mn 75,000 were added to 190 g of ethyl acetate. Then, the mixture was heated to approximately 60° C. and stirred to completely dissolve the copolymer of example 2. Next, a porous fabric of polyethylene terephthalate (PET) of approximately 250 µm thick, 5 cm long, and 5 cm wide was immersed in the solution for approximately 10 minutes. The PET porous fabric was then hung to remove extra solution and finally dried at approximately 60° C. for approximately 30 minutes. Dried copolymer was formed along the profile of the PET porous fabric to become porous. The electret composite of the VdF/TFE copolymer of example 2 and PET porous fabric was then polarized by corona discharge under potential difference approximately 18 KV at room temperature. The initial surface potential of the polarized composite was approximately 2950V. The electret composite was continuously measured for surface potential when standing at room temperature at predetermined times. The results are listed in Table 1, and shown in a trend chart as in data 2 in FIG. 1.

Figure 3A:
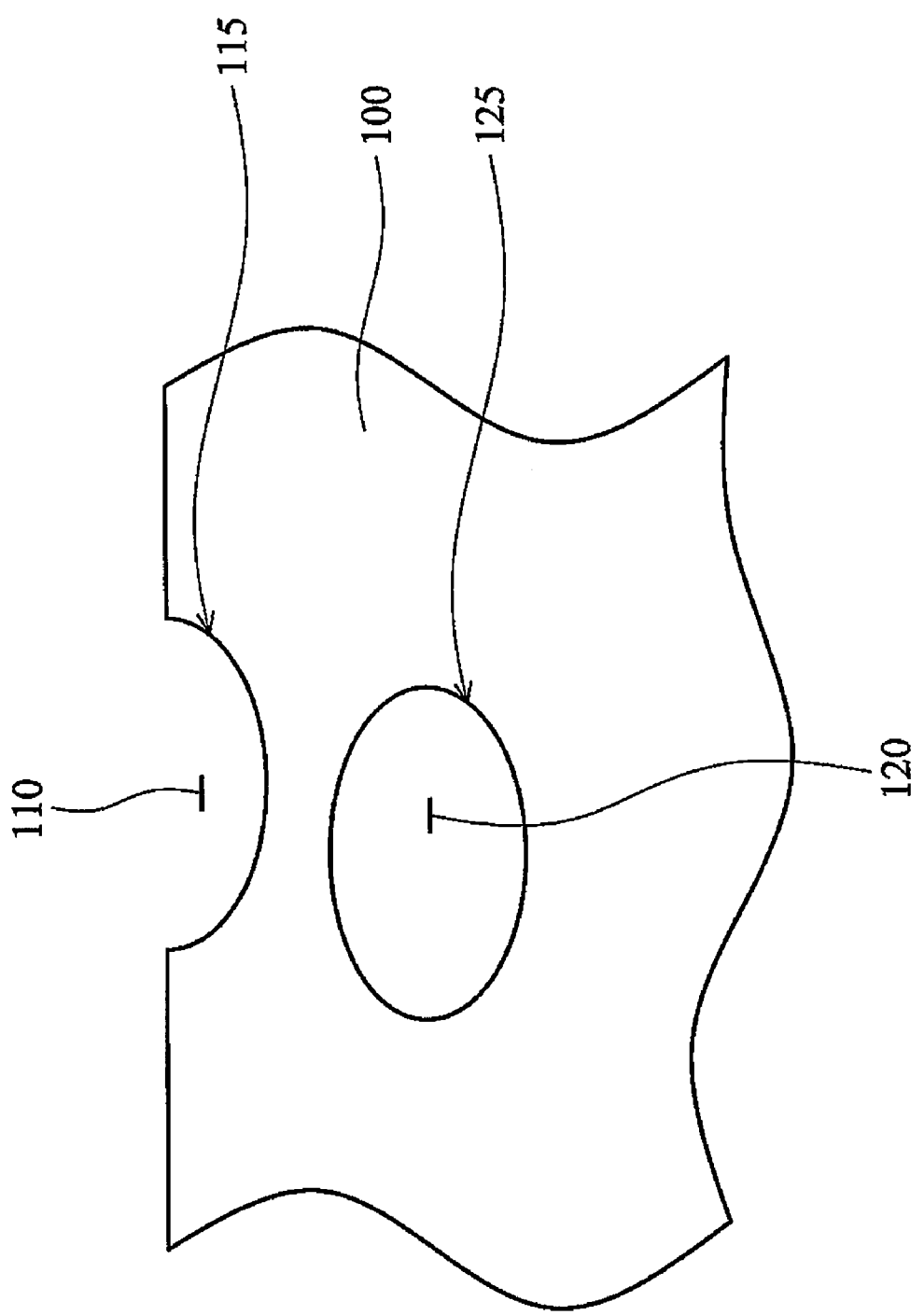
FIGS. 3A and 3B are cross-sections of coating an electret on a porous substrate along the profile thereof.
Figure 3B:
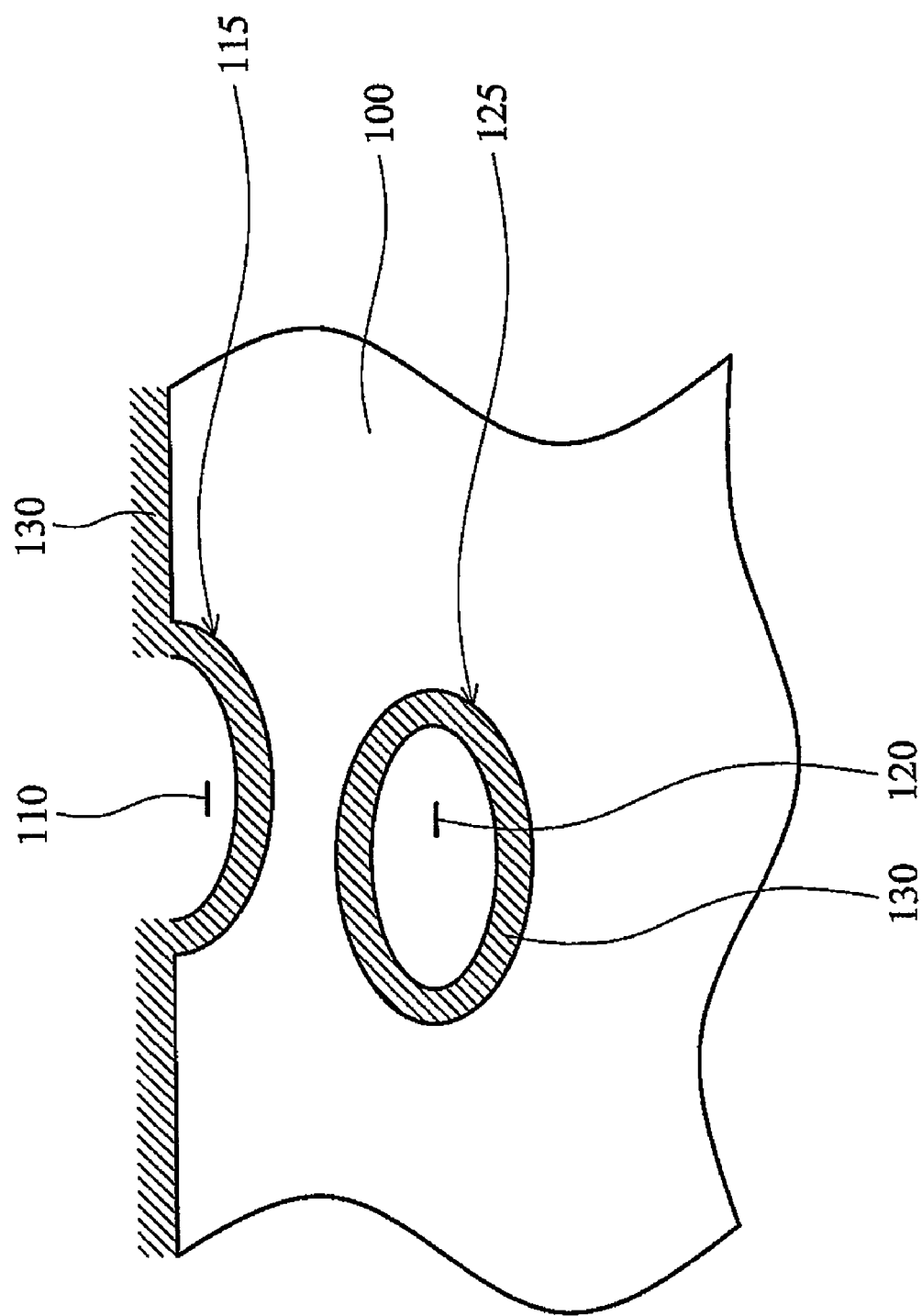

Referring to FIGS. 3A and 3B, for example, a part of substrate 100, which is the porous fabric, is shown. The substrate 100 comprises an outer pore 110 exposed in a surface thereof and an inner pore 120 inside the body thereof. The outer pore 110 and inner pore 120 respectively have inner walls 115 and 125. As described, when the substrate 100 was immersed in the electret solution, followed by hung to remove extra solution and dried, dried copolymer 130 was formed along the profile of the substrate 100, and more specifically, coated on the inner walls 115 and 125.

The porous fabric used in this example can be porous woven or nonwoven fabric of PET, polyethylene, polypropylene, polytetrafluoroethylene, polystyrene, or polyvinyl chloride. The solvent used in this example can be ethyl acetate, acetone, methyl ethyl ketone, methyl isobutyl ketone, 1-methyl-2-pyrrolidone, dimethyl sulfoxide, dimethylformamide, or combinations thereof.

EXAMPLE 4

A test sample, approximately 3 cm long, 2 cm wide, and 0.05 cm thick of the VdF/TFE copolymer of example 2 was fabricated, followed by polarization by corona discharge under potential difference approximately 18 KV at room temperature. The initial surface potential of the test sample was approximately 1350V. The test sample was continuously measured for surface potential at room temperature at predetermined times. The results are listed in Table 1, and shown in a trend chart showing in data 1 in FIG. 1.

TABLE 1

| Days | Example 3 (volts) | Example 4 (volts) |
| --- | --- | --- |
| 0 | 2950 | 1350 |
| 1 | 1890 | 256 |
| 5 | 1770 | 187 |
| 10 | 1620 | 163 |
| 15 | 1520 | 152 |
| 20 | 1480 | 144 |
| 25 | 1470 | 139 |
| 30 | 1470 | 139 |

COMPARATIVE EXAMPLE

Figure 2:
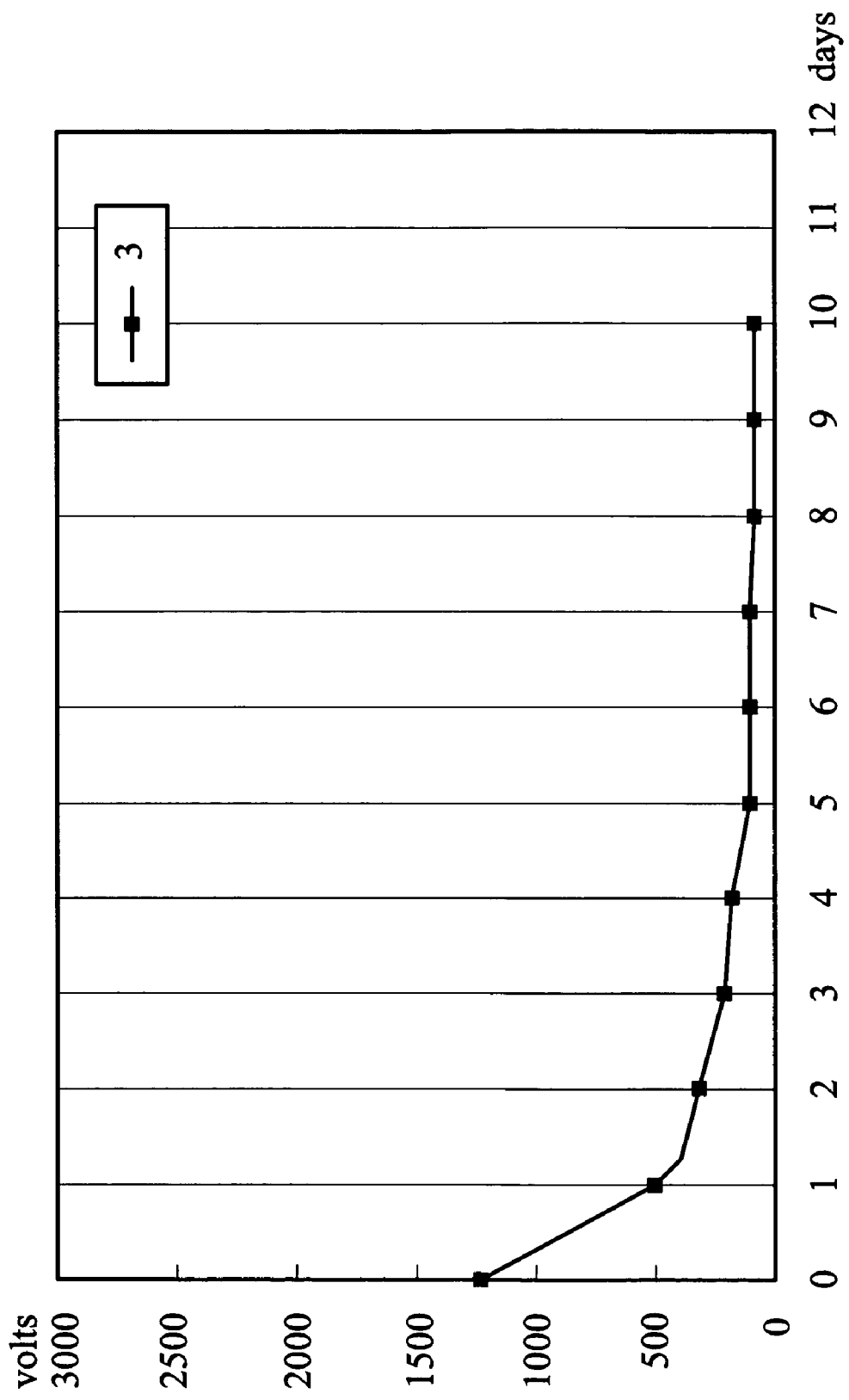
FIG. 2 is a trend chart of results of initial surface potential and charge stability of a polarized conventional electret.

A test sample of commercial Teflon FEP film was polarized by corona discharge under potential difference approximately 18 KV at room temperature. The initial surface potential of the Teflon FEP film was approximately 1215V. The Teflon FEP film was continuously measured for surface potential at room temperature at predetermined times. The results are listed in Table 2, and shown in a trend chart showing in data 3 in FIG. 2.

TABLE 2

| Days | Comparative Example (volts) |
| --- | --- |
| 0 | 1215 |
| 1 | 500 |
| 2 | 315 |
| 3 | 212 |
| 4 | 182 |
| 5 | 104 |
| 6 | 101 |
| 7 | 100 |
| 8 | 98 |
| 9 | 86 |
| 10 | 87 |

RESULTS

The electrets in accordance with examples 3 and 4 of the present invention have higher initial surface potential than conventional electrets (as shown in the Comparative Example). Further, surface potential of electrets of examples 3 and 4 respectively decay to 55% and 12% of the initial surface potential thereof, but that of the conventional electret decays to 7%, showing efficacy of the inventive electret improving the polarized initial surface potential and lower the surface potential decay rate, thereby achieving the objects of the present invention.

Although the present invention has been particularly shown and described with reference to the preferred specific embodiments and examples, it is anticipated that alterations and modifications thereof will no doubt become apparent to those skilled in the art. It is therefore intended that the following claims be interpreted as covering all such alteration and modifications as fall within the true spirit and scope of the present invention.

What is claimed is:

1. An electret composite, comprising:
   a porous substrate; and
   an electret coated on the substrate along the porous profile thereof, the electret having a first polymer copolymerizing from monomers having vinylidene fluoride (VdF) as a first monomer, hexafluoropropylene (HFP), chlorotrifluoro ethylene (CTFE), tetrafluoro ethylene (TFE), or combinations thereof as a second monomer, and a third monomer including glyceryl methacrylamide, acrolein, or combinations thereof.

2. The composite as claimed in claim 1, wherein the substrate comprises a nonwoven or woven fabric of polyethylene terephthalate, polyethylene, polypropylene, polytetrafluoroethylene, polystyrene, or polyvinyl chloride.

3. The composite as claimed in claim 1, wherein the content of VdF in the first polymer is between 10 mole % and 80 mole %.

4. The composite as claimed in claim 1, wherein the content of HFP in the first polymer is approximately 30 mole % or less.

5. The composite as claimed in claim 1, wherein the content of CTFE in the first polymer is approximately 30 mole % or less.

6. The composite as claimed in claim 1, wherein the content of TFE in the first polymer is approximately 40 mole % or less.

7. The composite as claimed in claim 1, wherein the content of the third monomer in the first polymer is approximately 30 mole % or less.

8. The composite as claimed in claim 1, wherein the content of fluorine element in the first polymer is between 60 and 76 wt %.

9. The composite as claimed in claim 1, wherein the electret further comprises a second polymer mixed with the first polymer, the second polymer comprising polymethacrylate, polyvinyl acetate, polycarbonate, polyurethane, polyester, polyimide, poly(butylene terephthalate), or polystyrene.

10. The composite as claimed in claim 9, wherein the content of second polymer in the electret is approximately 60 wt % or less.

11. The composite as claimed in claim 1, wherein the substrate is coated by dissolving the electret in acetone, methyl ethyl ketone, methyl isobutyl ketone, 1-methyl-2- pyrrolidone, dimethyl sulfoxide, dimethylformamide, or combinations thereof to form a solution, immersing the substrate in the solution, taking the substrate from the solution, and evaporating the solution therefrom.

12. The composite as claimed in claim 1, wherein a initial surface potential of the electret is between 2820 and 2950V when polarized by corona discharge under potential difference approximately 18KV.

13. The composite as claimed in claim 12, wherein a surface potential of the electret is 50 to 55% of the initial surface potential at room temperature for approximately 10 days from polarization.

14. The composite as claimed in claim 1, wherein the electret is coated on the inner walls of the pores of the porous substrate.

* * * * *